(12) United States Patent
Stephenson et al.

(10) Patent No.: US 9,382,868 B2
(45) Date of Patent: Jul. 5, 2016

(54) CYLINDER BORE SURFACE PROFILE AND PROCESS

(71) Applicant: FORD GLOBAL TECHNOLOGIES, LLC, Dearborn, MI (US)

(72) Inventors: David Alan Stephenson, Detroit, MI (US); Timothy George Beyer, Troy, MI (US); Keith Raymond Bartle, Sterling Heights, MI (US); Mackenzie Thomas Van Loon, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 14/251,732

(22) Filed: Apr. 14, 2014

(65) Prior Publication Data

US 2015/0292432 A1    Oct. 15, 2015

(51) Int. Cl.
*F02F 1/18*    (2006.01)
*F02F 1/00*    (2006.01)
*B23P 15/00*    (2006.01)

(52) U.S. Cl.
CPC ... *F02F 1/18* (2013.01); *F02F 1/00* (2013.01); *B23P 15/00* (2013.01)

(58) Field of Classification Search
CPC ............... F02F 1/18; F02F 1/00; F16J 10/00; F16J 10/02; F16J 10/04; B23P 15/00
USPC ....................... 123/193.2; 29/888.06, 888.061
See application file for complete search history.

(56) References Cited

U.S. PATENT DOCUMENTS

| | | |
|---|---|---|
| 3,031,330 A | 4/1962 | Hornick et al. |
| 3,114,960 A | 12/1963 | Einaudi |
| 3,324,496 A | 6/1967 | Haracz |
| 3,833,321 A | 9/1974 | Telang et al. |

(Continued)

FOREIGN PATENT DOCUMENTS

| | | |
|---|---|---|
| DE | 4411296 A1 | 7/1995 |
| DE | 19508687 | 10/1995 |

(Continued)

OTHER PUBLICATIONS

C. Verpoort, W. Blume, R. Ehrenpreis, Ford Motor Company, ICES-2006-1391, Proceedings of ICES2006, Therma Spraying of Aluminum Cylinder Bores by the Ford PTWA Spray Process, 2006 Internal Combustion Engine Division Spring Technical Conference May 7-10, 2006, Aachen, Germany.

(Continued)

*Primary Examiner* — Grant Moubry
(74) *Attorney, Agent, or Firm* — Damian Porcari; Brooks Kushman P.C.

(57) ABSTRACT

An engine block has a cylinder bore wall comprising a first portion having a first diameter and a second portion axially adjacent to the first portion having a second diameter greater than the first diameter. A series of parallel, circumferentially-extending grooves is formed in the second portion to roughen the surface and enhance adhesion of a later-applied, sprayed-on metallic coating. A non-masking section is formed between the first and the second portions to provide for a less-abrupt corner between the larger diameter and smaller diameter portions and eliminate any spray-masking that may otherwise. The non-masking section may be a flat or a curved chamfer. The non-masking section may be a non-grooved section of constant diameter.

10 Claims, 6 Drawing Sheets

(56) References Cited

U.S. PATENT DOCUMENTS

| | | | |
|---|---|---|---|
| 4,324,017 A | 4/1982 | Viehe | |
| 4,646,479 A | 3/1987 | Walker et al. | |
| 4,967,458 A | 11/1990 | Rosenberg et al. | |
| 5,050,547 A | 9/1991 | Takahashi | |
| 5,107,967 A | 4/1992 | Fujita et al. | |
| 5,194,304 A | 3/1993 | McCune, Jr. et al. | |
| 5,212,738 A | 5/1993 | Chande et al. | |
| 5,239,955 A | 8/1993 | Rao et al. | |
| 5,332,422 A | 7/1994 | Rao | |
| 5,363,821 A | 11/1994 | Rao et al. | |
| 5,380,564 A | 1/1995 | Vankuiken, Jr. et al. | |
| 5,466,906 A | 11/1995 | McCune et al. | |
| 5,480,497 A | 1/1996 | Zaluzec et al. | |
| 5,481,084 A | 1/1996 | Patrick et al. | |
| 5,622,753 A | 4/1997 | Shepley et al. | |
| 5,648,122 A | 7/1997 | Rao et al. | |
| 5,691,004 A | 11/1997 | Palazzolla et al. | |
| 5,820,938 A | 10/1998 | Pank et al. | |
| 5,922,412 A | 7/1999 | Baughman et al. | |
| 5,931,038 A * | 8/1999 | Higashi | B23P 9/02 123/193.2 |
| 5,958,520 A | 9/1999 | Cook et al. | |
| 5,958,521 A | 9/1999 | Zaluzec et al. | |
| 5,997,286 A | 12/1999 | Hemsath et al. | |
| 6,328,026 B1 | 12/2001 | Wang et al. | |
| 6,395,090 B1 | 5/2002 | Shepley et al. | |
| 6,441,619 B1 | 8/2002 | Araki et al. | |
| 6,589,605 B2 | 7/2003 | Shepley et al. | |
| 6,622,685 B2 | 9/2003 | Takahashi et al. | |
| 6,856,866 B2 | 2/2005 | Nakao | |
| 6,863,931 B2 | 3/2005 | Someno et al. | |
| 6,914,210 B2 | 7/2005 | Grossklaus, Jr. et al. | |
| 7,089,662 B2 | 8/2006 | Izquierdo et al. | |
| 7,165,430 B2 | 1/2007 | Weidmer | |
| 7,172,787 B2 | 2/2007 | Torigoe et al. | |
| 7,188,416 B1 | 3/2007 | Woehlke et al. | |
| 7,415,958 B2 | 8/2008 | Boehm et al. | |
| 7,533,647 B2 * | 5/2009 | Miyamoto | B22D 19/0009 123/193.2 |
| 7,533,657 B2 | 5/2009 | Onodera | |
| 7,568,273 B2 | 8/2009 | Iizumi et al. | |
| 7,607,209 B2 | 10/2009 | Iizumi et al. | |
| 7,758,910 B2 | 7/2010 | Moreau et al. | |
| 7,851,046 B2 * | 12/2010 | Nishimura | C23C 4/02 29/888.061 |
| 7,982,435 B2 | 7/2011 | Masuda | |
| 8,103,485 B2 | 1/2012 | Plett | |
| 8,171,910 B2 * | 5/2012 | Tachibana | F02F 1/004 123/193.2 |
| 8,209,831 B2 | 7/2012 | Boehm et al. | |
| 8,286,468 B2 * | 10/2012 | Nishimura | C23C 4/02 73/105 |
| 8,544,379 B2 * | 10/2013 | Paul | C23C 4/12 29/888.06 |
| 8,726,874 B2 * | 5/2014 | Whitbeck | B23P 15/00 123/193.1 |
| 9,109,276 B2 * | 8/2015 | Kanai | C23C 4/124 |
| 2003/0010201 A1 | 1/2003 | Takahashi et al. | |
| 2003/0052650 A1 | 3/2003 | Gunji | |
| 2004/0065290 A1 | 4/2004 | Wakade et al. | |
| 2004/0079556 A1 | 4/2004 | Cramer et al. | |
| 2005/0064146 A1 | 3/2005 | Hollis et al. | |
| 2005/0137829 A1 | 6/2005 | Gimelfarb et al. | |
| 2006/0021809 A1 | 2/2006 | Xu et al. | |
| 2006/0100833 A1 | 5/2006 | Plett | |
| 2007/0000129 A1 | 1/2007 | Hahn et al. | |
| 2007/0012177 A1 | 1/2007 | Miyamoto et al. | |
| 2007/0078521 A1 | 4/2007 | Overholser et al. | |
| 2008/0244891 A1 | 10/2008 | Iizumi et al. | |
| 2008/0245226 A1 | 10/2008 | Iizumi et al. | |
| 2008/0252412 A1 | 10/2008 | Larsson et al. | |
| 2008/0260958 A1 | 10/2008 | Sekikawa et al. | |
| 2009/0031564 A1 | 2/2009 | Meier | |
| 2009/0058366 A1 | 3/2009 | Masuda | |
| 2009/0175571 A1 | 7/2009 | Boehm et al. | |
| 2010/0031799 A1 | 2/2010 | Ast et al. | |
| 2010/0101526 A1 | 4/2010 | Schaefer et al. | |
| 2010/0139607 A1 | 6/2010 | Herbst-Dederichs et al. | |
| 2010/0316798 A1 * | 12/2010 | Takahashi | B05B 13/0618 427/236 |
| 2011/0000085 A1 | 1/2011 | Kanai et al. | |
| 2011/0023777 A1 | 2/2011 | Nishimura et al. | |
| 2011/0030663 A1 | 2/2011 | Verpoort et al. | |
| 2011/0297118 A1 | 12/2011 | Izawa et al. | |
| 2012/0018407 A1 | 1/2012 | Schramm et al. | |

FOREIGN PATENT DOCUMENTS

| | | |
|---|---|---|
| DE | 4447514 A1 | 2/1996 |
| DE | 19919024 | 11/2000 |
| DE | 102005055984 A1 | 5/2007 |
| DE | 60131096 | 2/2008 |
| DE | 102006045275 | 2/2008 |
| DE | 102006057641 A1 | 6/2008 |
| DE | 102008022225 | 11/2009 |
| DE | 102008024313 | 12/2009 |
| DE | 102008058452 | 2/2010 |
| DE | 102009008741 | 8/2010 |
| DE | 102010014689 | 10/2011 |
| DE | 102010053327 A1 | 6/2012 |
| EP | 0716158 | 6/1996 |
| EP | 0903422 A1 | 3/1999 |
| EP | 0919715 | 6/1999 |
| EP | 00816527 B1 | 7/2000 |
| EP | 1504833 A1 | 11/2003 |
| EP | 1408134 A1 | 4/2004 |
| EP | 1416063 A1 | 5/2004 |
| EP | 1559807 | 8/2005 |
| EP | 1854903 | 11/2007 |
| EP | 1967601 A2 | 9/2008 |
| JP | 1-246352 | 10/1989 |
| JP | 08111582 A | 4/1996 |
| JP | 2001245457 | 9/2001 |
| JP | 2005336556 A | 5/2005 |
| JP | 2006097045 | 4/2006 |
| JP | 2006097046 | 4/2006 |
| JP | 2007277607 | 10/2007 |
| JP | 2010209454 A | 9/2010 |
| JP | 2010275898 | 12/2010 |
| RU | 2297314 C2 | 4/2007 |
| SU | 1310181 A1 | 5/1987 |
| WO | 0037789 A1 | 6/2000 |
| WO | 2005040446 A1 | 5/2005 |
| WO | 2005273425 | 8/2005 |
| WO | 2006061710 | 6/2006 |
| WO | 2006061710 A1 | 6/2006 |
| WO | 2007007821 A1 | 1/2007 |
| WO | 2007087989 | 8/2007 |
| WO | 2008034419 | 3/2008 |
| WO | 2010015229 | 2/2010 |
| WO | 2011161346 | 12/2011 |

OTHER PUBLICATIONS

Eberhard Kretzschmar, The Metal Spraying Process and its Application in our history, Veb Carl Marhold Publishing House, Halle (Salle), 1953.

Applicants' Statement of Relevance in Accordance With 37 C.F.R. 1.98(a)(3)(i) for IDS Reference JP 2001-245457.

Peter Ernst, Gerard Barbezat, Thermal Spray Applications in Powertrain Contribute to the Savings of Energy and Material Resources, Sulzer Metco AG Switzerland, Rigackerstrasse 16, 5610 Wohlen, Switzerland.

Journal of Thermal Spray Technology, JTTEE5 16: 181-182, in the News, Conference and Workshop Information, vol. 16(2) Jun. 2007.

* cited by examiner

CYLINDER BORE SURFACE PROFILE AND PROCESS

TECHNICAL FIELD

The present invention relates to a cylinder bore of an engine block and a process for forming such a cylinder bore.

BACKGROUND

Automotive engine blocks include a number of cylinder bores. The inner surface of each cylinder bore is machined so that the surface is suitable for use in automotive applications, e.g., exhibits suitable wear resistance and strength. The machining process may include roughening the inner surface, applying a metallic coating to the roughened surface, and subsequently honing the metallic coating to obtain a finished inner surface. Various surface roughening techniques are known in the art, but have suffered from one or more drawbacks or disadvantages.

SUMMARY

In a first disclosed embodiment, an engine block has a cylinder bore wall comprising a first portion having a first diameter and a second portion axially adjacent to the first portion having a second diameter greater than the first diameter. A series or plurality of parallel, circumferentially-extending grooves is formed in the second portion. A non-masking section comprises a circumferential chamfer between the first and the second portions. The chamfer provides for a less-abrupt corner between the larger diameter and smaller diameter portions and so eliminates any spray-masking that may otherwise occur when a metal spray coating is applied to the cylinder bore wall.

In another disclosed embodiment, the chamfer has a flat surface. The flat surface may be disposed at an angle relative to a plane normal to the longitudinal axis of the cylinder bore, the angle having an approximate range of 15° to 60°.

In another disclosed embodiment, the chamfer has a curved surface. The curved surface may be convex.

In another disclosed embodiment, a method of forming an engine block having a cylinder bore comprises forming a first portion of the bore having a first diameter, forming a second portion of the bore having a second diameter greater than the first diameter, and forming a plurality of circumferentially-extending grooves in the second portion. The method further comprised forming a non-masking section comprising a circumferential chamfer between the first and the second portions.

In another disclosed embodiment, a cylinder bore has a cylindrical wall comprising a first portion having a first diameter, and a second portion axially adjacent to the first portion having a second diameter greater than the first diameter. The second portion comprises a grooved section having a series of circumferentially-extending, alternating grooves and teeth disposed thereon, and a non-masking section immediately adjacent to an end surface between the first and second portions. The non-masking section has a constant diameter and an axial length at least two times a width of the grooves. The non-masking section may have a diameter substantially equal to a bore diameter measured to peaks of teeth of the grooved section. Alternatively, the non-masking section may have a diameter substantially equal to a bore diameter measured to bottoms of the grooves.

In another disclosed embodiment, a method of forming a cylinder bore defining a cylindrical wall, the cylindrical wall comprises forming the first portion to have a first diameter, forming the second portion to have a diameter greater than the diameter of the first portion, and forming a series of circumferentially-extending, alternating grooves and teeth on the second portion. The series of grooves and teeth terminate a distance from an end surface between the first and second portions to define a non-masking section immediately adjacent to the end surface, the non-masking section having a constant diameter and an axial length at least two times a width of the grooves.

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

Reference will now be made in detail to embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material are to be understood as modified by the word "about" in describing the broadest scope of the present invention.

Automotive engine blocks include a number of cylinder bores. The inner surface of each cylinder bore is machined so that the surface is suitable for use in automotive applications, e.g., exhibits suitable wear resistance and strength. The machining process may include roughening the inner surface, applying a metallic coating to the roughened surface, and subsequently honing the metallic coating to obtain a finished inner surface with requisite strength and wear resistance. The roughening of the surface enhances the adhesion of the metallic coating to the cylinder bore. Alternatively, a liner material having requisite strength and wear resistance characteristics may be applied to the unfinished inner surface of the cylinder bore.

Embodiments disclosed herein provide processes for roughening the inner surface of cylindrical bores, e.g., cylinder bores of an engine block, to enhance the adhesion and bonding of a subsequently applied metallic coating, e.g., thermal spray coating, onto the inner surface. Accordingly, the finished inner surface may have enhanced strength and wear resistance.

Figure 1A:
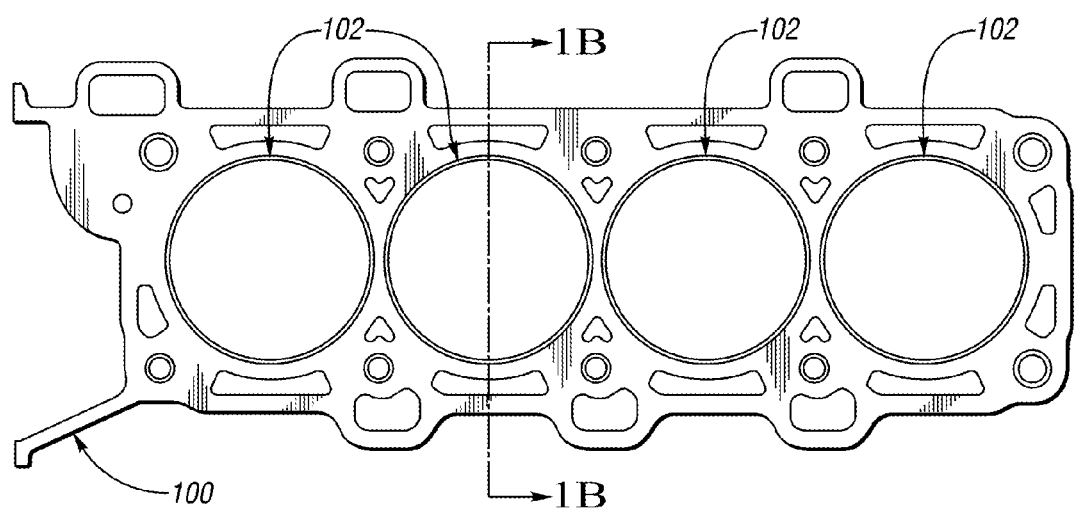
FIG. 1A depicts a top view of a joint or deck face of an exemplary engine block of an internal combustion engine.
Figure 1B:
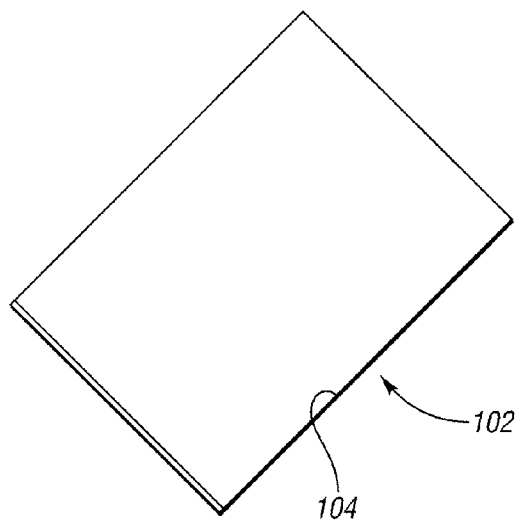
FIG. 1B depicts an isolated, cross-sectional view of a cylinder bore taken along line 1B-1B of FIG. 1A.

FIG. 1A depicts a top view of a joint face of an exemplary engine block 100 of an internal combustion engine. The engine block includes cylinder bores 102. FIG. 1B depicts an isolated, cross-sectional view of cylinder bore 102 taken along line 1B-1B of FIG. 1A. Cylinder bore 102 includes an inner wall portion 104, which may be formed of a metal material, such as, but not limited to, aluminum, magnesium or iron, or an alloy thereof, or steel. In certain applications, aluminum or magnesium alloy may be utilized because of their relatively light weight compared to steel or iron. The relatively light weight aluminum or magnesium alloy materials may permit a reduction in engine size and weight, which may improve engine performance and fuel economy.

Figure 2A:
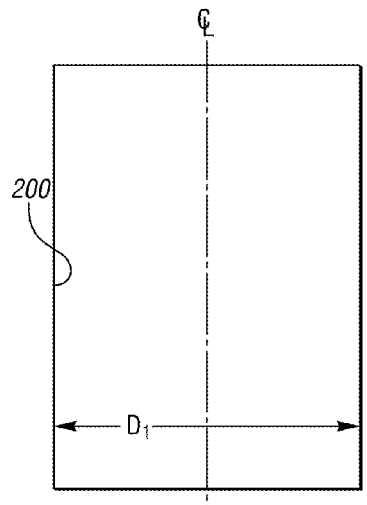
FIG. 2A depicts a cylinder bore after a pre-boring step in which an unprocessed cylinder bore inner wall is bored to a diameter.

FIGS. 2A, 2B, 2C, 2D and 2E depict cross-sectional views of a cylinder bore inner wall relating to steps of a process for applying a profile to the inner wall or surface of the cylinder bore. The steps are to prepare the cylinder bore for spray application of a metal coating layer, in a manner well-known in the art. FIG. 2A depicts a pre-boring step in which an unprocessed cylinder bore inner wall 200 is bored to a first diameter $D_1$ that typically is less than the diameter of the finished, e.g., honed, diameter of the inner wall. In some variations, the difference in diameter is 150 to 250 microns (μms).

Figure 2B:
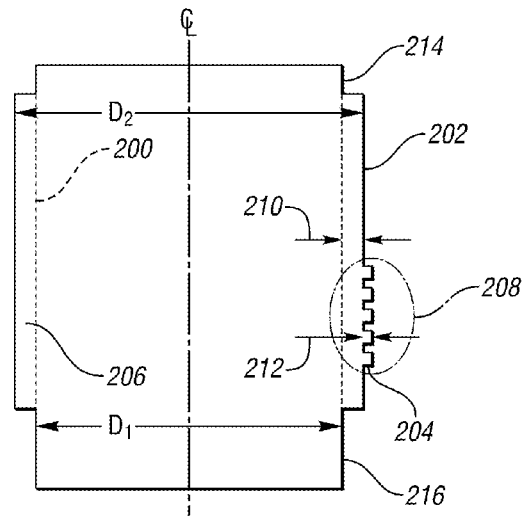
FIG. 2B depicts a cylinder bore after an interpolating step in which a travel area is machined to produce a recessed pocket and circumferential grooves and teeth.

FIG. 2B depicts an interpolating step in which a pocket 206 having a second diameter $D_2 > D_1$ is machined into the pre-bored inner wall 200. The axial extent of pocket 206 generally corresponds to a travel area 202, the distance over which rings of a piston (not shown) travel within the cylinder bore. The travel area surface is manufactured to resist wear caused by travel of the piston rings. In some variations, the length of travel area 202 is 90 to 150 millimeters. The interpolating step may be performed using a cutting tool (not shown) of the type disclosed in U.S. patent application Ser. No. 13/913,871, the disclosure of which is incorporated herein by reference.

As a result of the interpolating step, the cylinder bore also includes non-travel areas 214 and 216. These areas are outside (above and below, respectively) the axial travel distance of the piston, so that wear resistance of the surface is not as important as in the travel area. In some variations, the length of non-travel area 214 is 2 to 7 millimeters. In some variations, the length of non-travel area 216 is 5 to 25 millimeters.

Interpolation-based roughening can be accomplished with a cutting tool (not shown) which forms (as shown in magnified area 208 of FIG. 2B) a series of parallel, circumferentially-extending alternating grooves 204 and teeth 207 in the surface of cylinder bore 200. The grooves and teeth may initially be formed in a square-wave pattern of a uniform dimension, the bottoms of the grooves and the tops of the teeth being flat. The cutting tool may form grooves 204 and teeth 207 substantially simultaneous with forming the second diameter $D_2$. The cutting tool can be used to roughen only a selected area of the bore, such as the ring travel area 202 of the bore. Roughening only the ring travel area of the bore may reduce coating cycle time, material consumption, honing time and overspray of the crank case.

It should be understood that the size, shape, and number of grooves and teeth shown in magnified area 208 are simply exemplary, and that the alternating grooves and teeth preferably extend over substantially the entire length of travel area 202 except for those portions as described below. Dimension 210 shows the depth of pocket 206, equal to one-half of the difference between second diameter $D_2$ and first diameter $D_1$. Dimension 212 shows the depth of circumferential grooves 204. In some variations, the groove depth is 100 to 140 microns. In another variation, the groove depth is 120 microns. In some variations, the pocket depth is 100 to 300 microns. In another variation, the pocket depth is 250 microns.

Figure 2C:
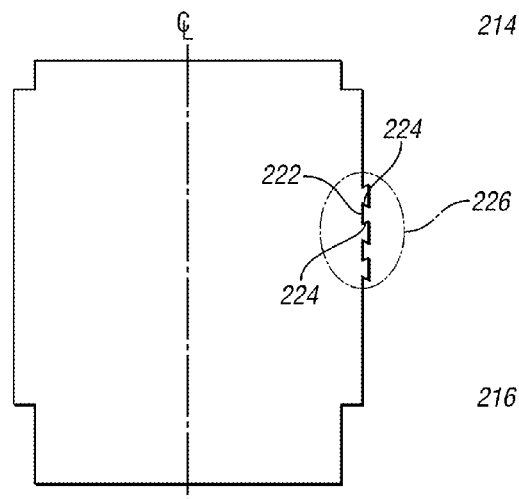
FIG. 2C depicts a cylinder bore after a deforming step in which flat peaks between adjacent grooves are deformed to obtain deformed teeth.

FIG. 2C depicts the cylinder bore after an optional deforming step in which the flat tops of the teeth 207 are deformed to obtain deformed peaks 222 in which each peak 222 includes a pair of undercuts 224, as shown in magnified area 226 of FIG. 2C. The deforming step results in grooves 204 and teeth 207 having generally trapezoidal cross-sections. It should be understood that the size, shape, and number of deformed grooves and teeth shown in magnified area 226 are simply exemplary. The deforming step may be carried out using a swiping tool of the type disclosed in U.S. patent application Ser. No. 13/913,871.

Figure 2D:
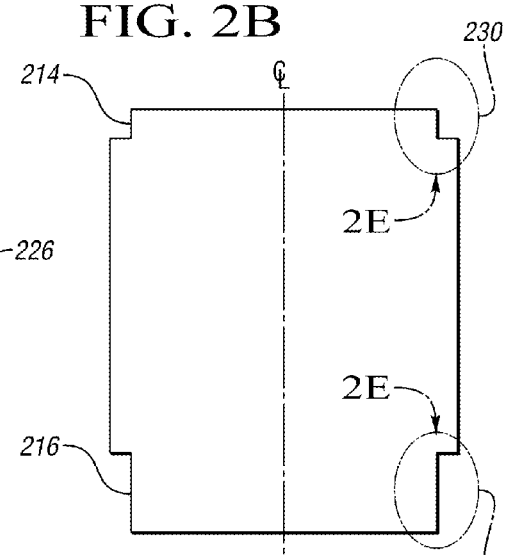
FIG. 2D depicts a cylinder bore after an interpolating step in which one or more of the non-travel areas are machined to form circumferential grooves and teeth.
Figure 2E:
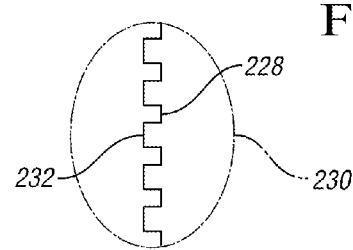
FIG. 2E shows a magnified, schematic view of circumferential grooves formed in the non-travel areas of a cylinder bore.

FIG. 2D depicts the cylinder bore after an optional interpolating step in which one or both of the non-travel areas 214 and 216 are machined using a cutting tool (not shown) to form alternating circumferential grooves 228 and teeth 232, as shown in magnified area 230 of FIG. 2E. The teeth in non-travel areas will typically not be deformed and so teeth 232 and grooves 228 retain their rectangular cross-sections. It should be understood that the number of grooves shown in magnified area 230 are simply exemplary. In one embodiment, the grooves form a square-wave shape of a uniform dimension. In some variations, the dimension is 25 to 100 microns.

The non-travel areas 214, 216 do not require a subsequent metal spray coating because when the engine block is in its completed condition (after final honing of the cylinder bore) no wear-resistant metal coating is present in those areas. However, a torch (not shown) applying the metal spray coating typically stays on throughout the spray process. If these non-travel areas are not roughened, then spray metal that is inadvertently sprayed on these areas may not adhere, causing delamination. This delamination may fall into the bore during honing and become entrapped between the honing stones and bore walls, causing unacceptable scratching. The delamination may also fall into the crank case, which would then require removal. As such, by applying the annual grooves identified herein to the non-ring travel areas, thermal spray material adheres during the spray process and mitigates contamination of the intended spray surface and the crank case. The metal coating that is sprayed onto the non-travel areas may be easily removed during subsequent honing operation.

Figure 3:
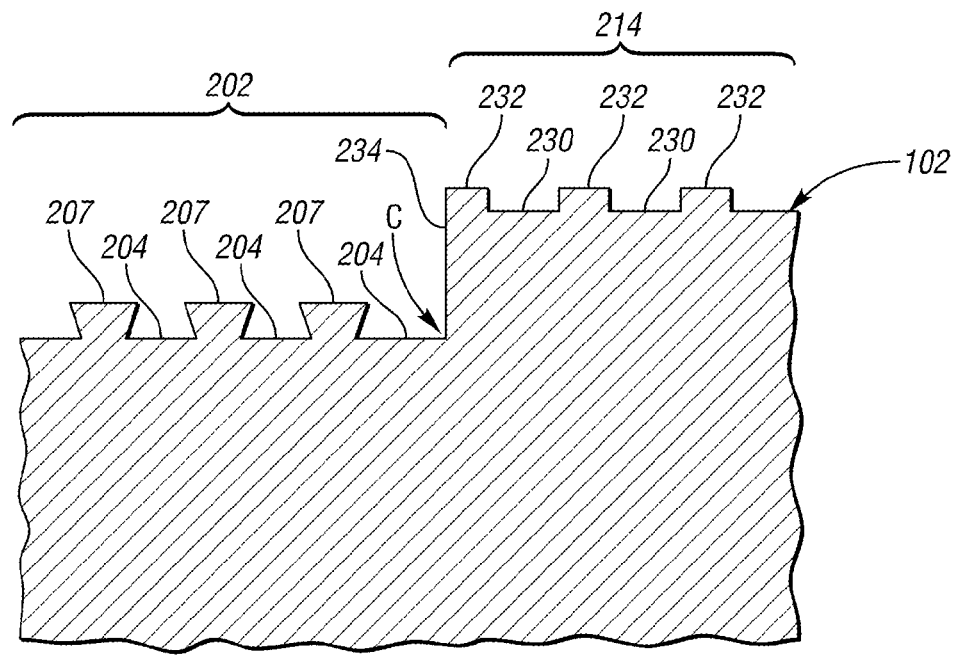
FIG. 3 shows an exploded, fragmented view of the inner surface of a cylinder bore according to the prior art before, during and after an interpolating step.

FIG. 3 illustrates a magnified, cross-sectional view of the inner wall of cylinder bore 200 at the conclusion of the steps illustrated in FIGS. 2A-2D. Non-travel surface 214 includes square grooves 230, and travel surface 202 includes trapezoidal grooves 204, such as may be formed by the swiping treatment discussed above. The prior-art interpolating step (described above in relation to FIG. 2B) forms an end surface 234 that is generally perpendicular to the surfaces of travel area 202 and non-travel area 214 on either side of the end surface (and generally normal to an axial centerline of the cylinder bore). It is apparent that the presence of a groove 204 immediately adjacent to end surface 234 creates a relatively narrow and deep corner C at that location.

Figure 4:
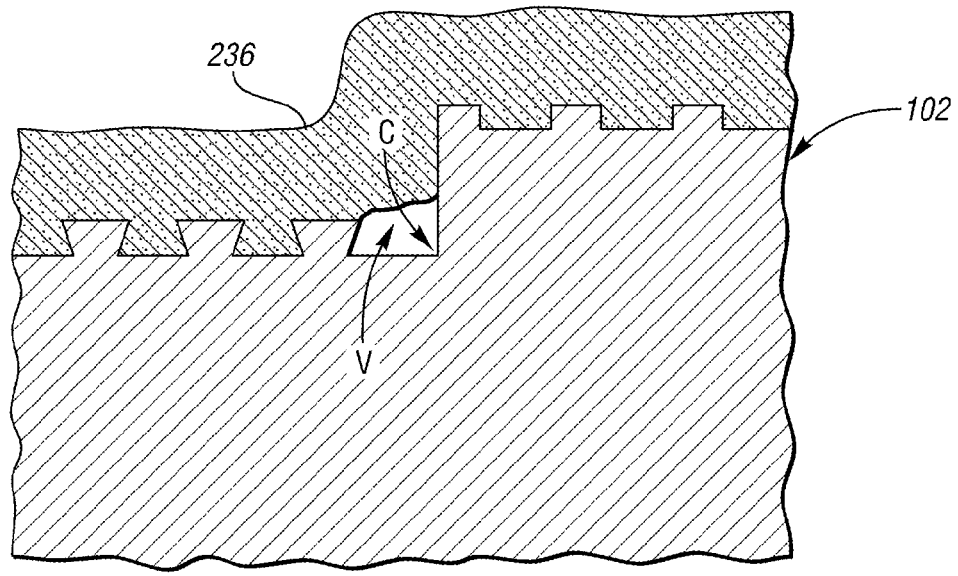
FIG. 4 shows the prior art cylinder bore of FIG. 3 after a metal coating has been sprayed onto the bore wall.

FIG. 4 illustrates a cross-section of cylinder bore wall 102 after the application of a metal coating material 236 by a spray process of a type known in the art. FIG. 4 illustrates that (as has been found from studying micrographs of engine blocks) the corner C may have a masking effect relative to the spray that prevents the metal coating from completely filling the corner C. This masking effect may result in a corner void V where the metal coating does not contact the base metal of the engine block. Such a corner void V results in a localized weakening of the adhesion between the spray coating and the engine block. Such a localized weakening of the adhesion may result in the metal coating separating from the block during subsequent machining steps (honing of the cylinder bore to the finished diameter, for example) or during operation of the engine.

Figure 5:
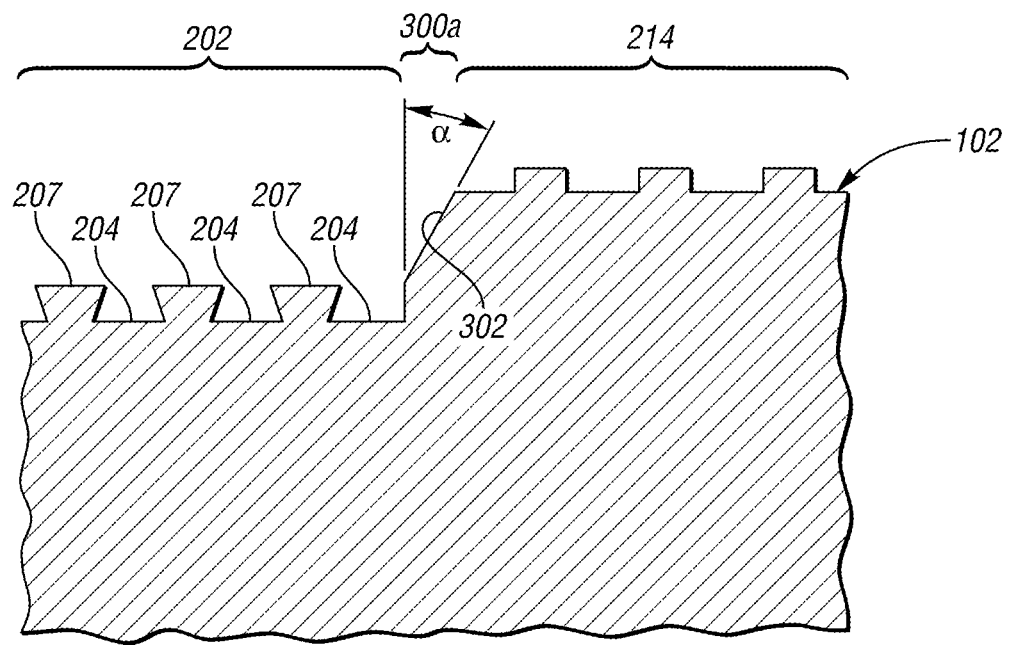
FIG. 5 illustrates a magnified, cross-sectional view of the inner surface of a cylinder bore having a non-masking section.

FIG. 5 illustrates a cross-section of a cylinder bore wall 102 having a non-masking section 300a adjacent to the juncture of the travel area 202 and the non-travel area 214. The non-masking section comprises a circumferential chamfer 302 which provides for a less-abrupt corner between the travel areas 202 (larger diameter) and the non-travel area 214 (smaller diameter) and so eliminates any spray-masking effect of the sharper corner C of the prior art (see FIGS. 3 and 4). Chamfer 302 has a generally flat surface disposed at an angle α relative to a plane normal to the longitudinal axis of the bore and so eliminates the sharp corner at the juncture of the two sections of different diameter. Angle α may advantageously be in range of from approximately 15° to 60°. The chamfer 302 has been found to be effective in allowing a metal coating (not shown) applied by a spray process to completely fill the corner (eliminating any corner void) and so provide improved adhesion relative to the prior art.

The term "non-masking section" is used herein to define a short portion of the axial length of a cylinder bore immediately adjacent to a juncture of a larger-diameter section and a smaller-diameter section, the section being shaped in a manner to minimize physical obstructions that may tend to block or mask a spray-application of a surface coating. In general, the non-masking section may be achieved by avoiding a sharp, abrupt, narrow, or deep corner at the juncture.

Figure 6:
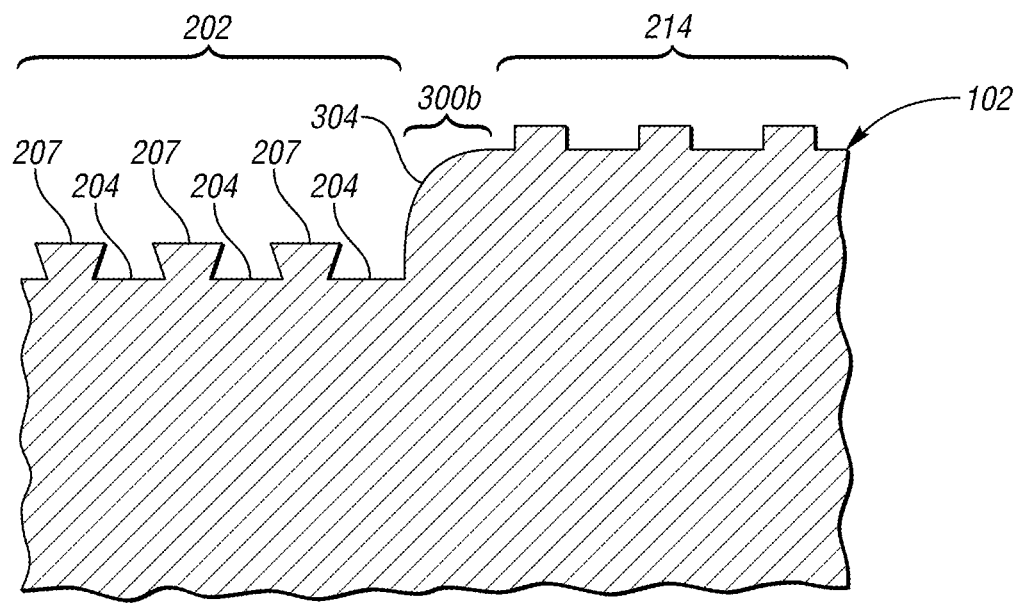
FIG. 6 illustrates a magnified, cross-sectional view of the inner surface of a cylinder bore having a second embodiment of a non-masking section.

FIG. 6 illustrates a cross-section of a cylinder bore wall having a non-masking section 300b comprising a chamfer 304 with a convex curved surface. In common with the embodiment described above in relation to FIG. 5, the chamfer 304 eliminates the sharp corner that would otherwise exist at the transition between the two diameters so that a metal coating (not shown) applied by a spray process is not masked and is therefore able to completely fill the corner with no void being formed.

Figure 7:
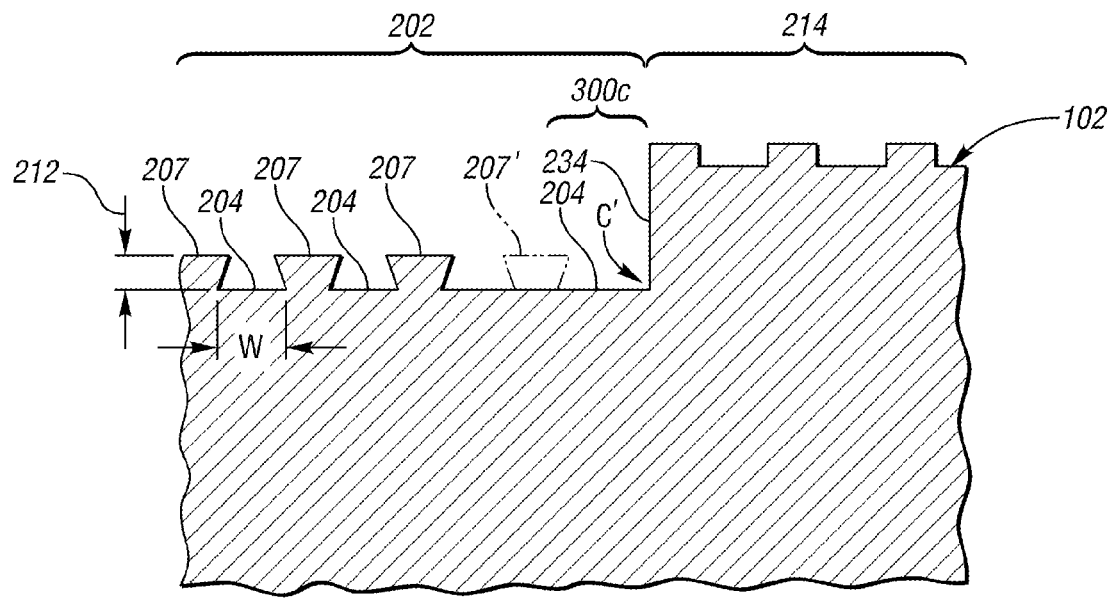
FIG. 7 illustrates a magnified, cross-sectional view of the inner surface of a cylinder bore having a third embodiment of a non-masking section.

FIG. 7 illustrates a cross-section of a cylinder bore wall having a travel area 202, a non-travel area 214, and an annular end surface 234 disposed between the two areas. The travel area 202 is subdivided into a grooved section having a series of alternating teeth 207 and grooves 204 formed thereon and a non-masking section 300c comprising a substantially smooth, constant-diameter length immediately adjacent to the end surface 234. "Substantially smooth" is defined as having no machined roughening features such as the alternating grooves and teeth formed along the grooved section, which constitutes the majority of the axial length of the travel area. Eliminating the machined surface roughening features (grooves and/or teeth) on the section of the travel area immediately adjacent to the end surface 234 produces a constant-diameter length which reduces the spray-masking effect that would otherwise be caused by having a groove or tooth in close proximity to the corner C'.

In the embodiment of FIG. 7, the non-masking section 300c is achieved by eliminating or "skipping" a single circumferential tooth that would otherwise be closest to the end surface 234, the position of the "skipped" tooth 207' being shown in broken line in FIG. 7. Skipping a single circumferential tooth provides a constant-diameter section having an axial length of at least two times a width W of the grooves 204. Two or more circumferential teeth immediately adjacent to the end surface 234 may be skipped (resulting in non-masking section 300c being axially longer) if it is found to be necessary to avoid spray masking. The diameter of the cylinder bore at non-masking area 300c is equal to the diameter $D_2$ (shown in FIG. 2B) plus two times the groove depth dimension 212.

In common with the embodiments shown in FIGS. 5 and 6, the substantially smooth section 300c minimizes physical obstructions at the corner C' between the respective diameters of the travel area and the non-travel area so that a spray-applied metal coating (not shown) is able to completely fill the corner, yielding improved adhesion to the cylinder block.

Figure 8:
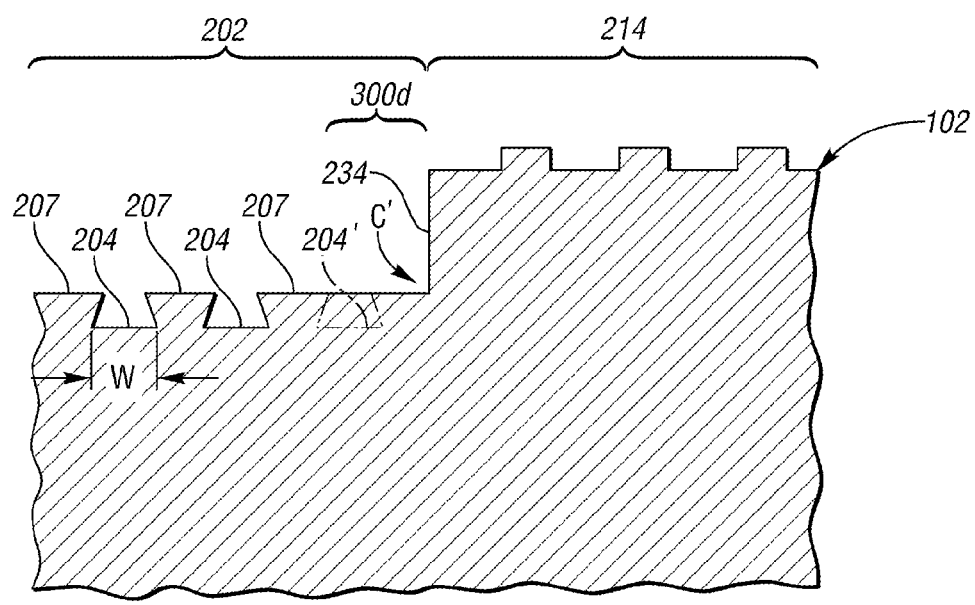
FIG. 8 illustrates a magnified, cross-sectional view of the inner surface of a cylinder bore having a fourth embodiment of a non-masking section.

FIG. 8 illustrates a cross-section of a cylinder bore wall having a non-masking section similar to that shown in FIG. 7, except that the substantially smooth constant-diameter section 300d is formed by eliminating or "skipping" one or more grooves that would otherwise be present in the travel area 202 immediately adjacent to the end surface 234. Eliminating the machined surface roughening on the portion of the travel area closest to the end surface 234 reduces the spray-masking effect that would otherwise be caused by having a tooth or groove in close proximity to the corner C'. In the embodiment shown, the substantially smooth length is achieved by eliminating or "skipping" only a single groove (the "skipped groove 204" indicated in hidden line in FIG. 8) that would otherwise be closest to the end surface 234. Skipping a single circumferential groove provides a non-masking section 300d of constant-diameter having an axial length of at least two times a width W of the grooves 204. More than one groove may be skipped (resulting in non-masking section 300d being longer) if it is found necessary to avoid spray masking.

The un-roughened length 300d minimizes physical obstructions at the corner C' between the two diameters so that the spray-applied metal coating (not shown) is able to completely fill the corner, yielding improved adhesion to the cylinder block.

Figure 9:
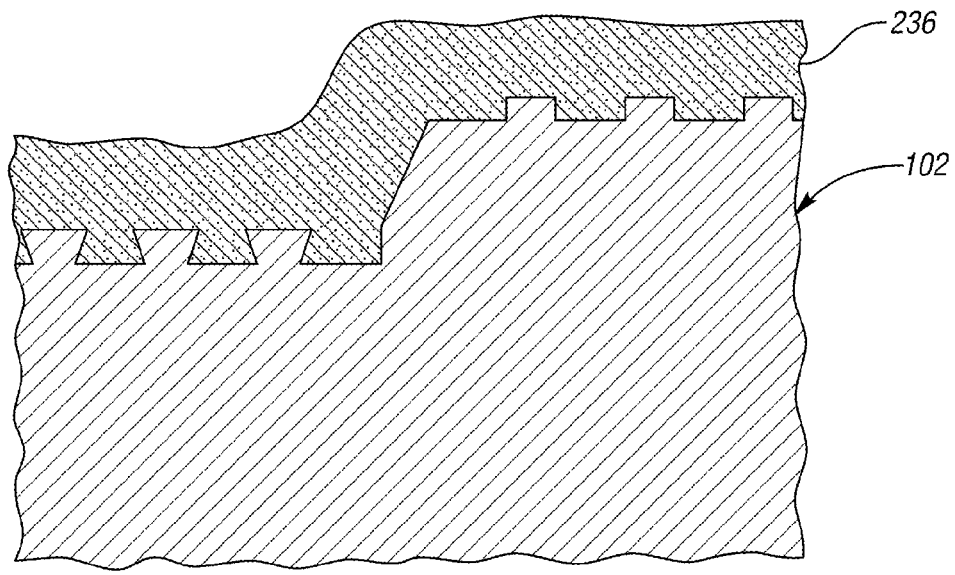
FIG. 9 illustrates the cylinder bore of FIG. 5 after a metal coating has been sprayed onto the bore wall.
Figure 10:
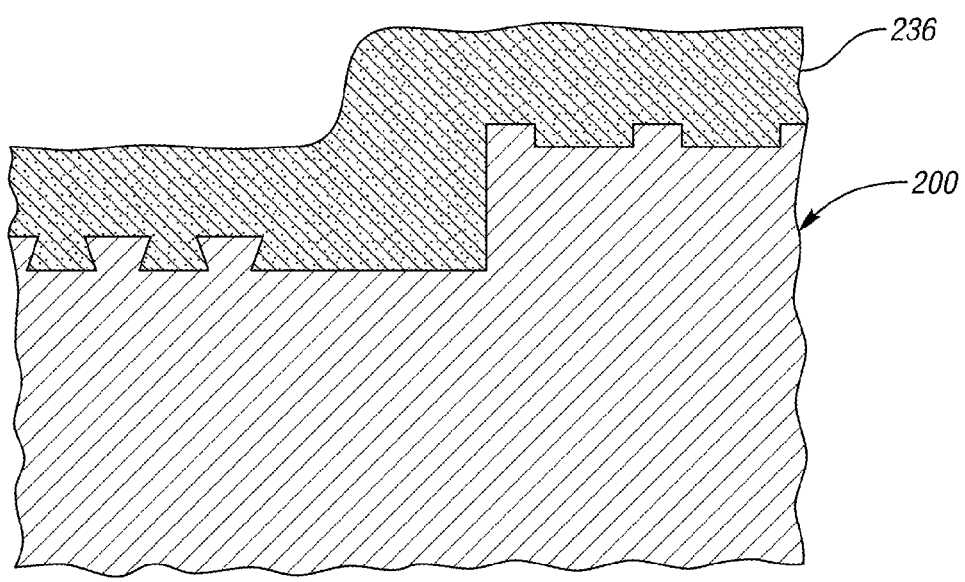
FIG. 10 illustrates the cylinder bore of FIG. 7 after a metal coating has been sprayed onto the bore wall.

FIGS. 9 and 10 illustrate the cylinder bores 102 of FIGS. 5 and 6, respectively, after a metal coating 236 has been sprayed onto the surface of the bore.

This application is related to the application having the Ser. No. 13/461,160, filed May 1, 2012, and incorporated by reference in its entirety herein. This application is also related to the application having the Ser. No. 13/913,871, filed Jun. 10, 2013, and incorporated by reference in its entirety herein.

This application is also related to the application having the Ser. No. 13/913,865, filed Jun. 10, 2013, and incorporated by reference in its entirety herein.

While the best mode for carrying out the invention has been described in detail, those familiar with the art to which this invention relates will recognize various alternative designs and embodiments for practicing the invention as defined by the following claims.

What is claimed:

1. An engine block having a cylinder bore wall with a longitudinal axis, the wall comprising:
   a first portion having a first diameter;
   a second portion axially adjacent to the first portion having a second diameter greater than the first diameter, and a plurality of parallel, circumferentially-extending, alternating grooves and teeth formed therein; and
   an un-roughened section immediately adjacent to an end surface between the first and the second portions, the un-roughened section having an axial length at least two times a width of the grooves and a diameter substantially equal to one of a first bore diameter measured to peaks of the teeth and a second bore diameter measured to bottoms of the grooves.

2. The engine block of claim 1, wherein the first portion has a second plurality of parallel circumferential grooves formed therein.

3. The engine block of claim 1, further comprising a third portion axially adjacent to the second portion at an end opposite from the first portion and having a third diameter smaller than the second diameter.

4. The engine block of claim 1, wherein a majority of the grooves in the plurality of grooves include a rectangular cross-section.

5. The engine block of claim 1, wherein a majority of the grooves in the plurality of grooves include a trapezoid cross-section.

6. A cylinder bore having a cylindrical wall with a longitudinal axis, the wall comprising:
   a first portion having a first diameter; and
   a second portion axially adjacent to the first portion having a second diameter greater than the first diameter, the second portion comprising a grooved section having a series of circumferentially-extending, alternating grooves and teeth disposed thereon, and the second portion further comprising an un-roughened section immediately adjacent to an end surface between the first and second portions, the un roughened section having a constant diameter substantially equal to a bore diameter measured to peaks of teeth of the grooved section and an axial length at least two times a width of the grooves.

7. The cylinder bore of claim 6, wherein the first portion has a second series of circumferentially-extending, alternating grooves and teeth disposed thereon.

8. A method of forming a cylinder bore having a longitudinal axis and defining a cylindrical wall, the cylindrical wall including a first portion and a second portion immediately adjacent to the first portion, the method comprising:
   forming the second portion to have a diameter greater than a diameter of the first portion; and
   forming a series of circumferentially-extending, alternating grooves and teeth on the second portion, the series of grooves and teeth terminating a distance from an end surface between the first and second portions to define an un-roughened non masking section immediately adjacent to the end surface, the un-roughened section having a constant diameter substantially equal to a bore diameter measured to peaks of teeth of the grooved section and an axial length at least two times a width of the grooves.

9. The method of claim 8, further comprising applying a metal coating over the second portion.

10. A cylinder bore having first and second axially-adjacent portions, the second portion having a diameter greater than the first portion and comprising:
    a series of circumferentially-extending, alternating grooves and teeth; and
    an un-roughened section immediately adjacent to an end surface between the first and second portions, and having a diameter substantially equal to a bore diameter measured to peaks of the teeth and an axial length at least two times a width of the grooves.

* * * * *